US006141750A

United States Patent [19]
Micali

[11] Patent Number: 6,141,750
[45] Date of Patent: Oct. 31, 2000

[54] SIMULTANEOUS ELECTRONIC TRANSACTIONS WITH SUBSCRIBER VERIFICATION

[76] Inventor: Silvio Micali, 459 Chestnut Hill Ave., Brookline, Mass. 02146

[21] Appl. No.: 08/939,959

[22] Filed: Sep. 29, 1997

Related U.S. Application Data

[63] Continuation-in-part of application No. 08/832,071, Apr. 2, 1997, which is a continuation of application No. 08/751,217, Nov. 18, 1996, Pat. No. 5,666,420, which is a continuation of application No. 08/408,551, Mar. 21, 1995, abandoned.
[60] Provisional application No. 60/027,614, Oct. 1, 1996.

[51] Int. Cl.⁷ ................................................. H04L 9/00
[52] U.S. Cl. ................................................. 713/168; 713/170
[58] Field of Search .................................. 705/78, 75, 67; 713/168–170

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,438,824 | 3/1984 | Mueller-Schloer . |
| 4,458,109 | 7/1984 | Mueller-Schloer . |
| 4,789,928 | 12/1988 | Fujisaki . |
| 4,885,777 | 12/1989 | Takaragi et al. . |
| 4,885,789 | 12/1989 | Burger et al. . |
| 4,953,209 | 8/1990 | Ryder, Sr. et al. . |
| 5,117,358 | 5/1992 | Winkler . |
| 5,202,977 | 4/1993 | Pasetes, Jr. et al. . |
| 5,214,700 | 5/1993 | Pinkas et al. . |
| 5,220,501 | 6/1993 | Lawlor et al. . |
| 5,243,515 | 9/1993 | Lee . |
| 5,276,737 | 1/1994 | Micali . |
| 5,315,658 | 5/1994 | Micali . |
| 5,440,634 | 8/1995 | Jones et al. . |
| 5,453,601 | 9/1995 | Rosen . |
| 5,455,407 | 10/1995 | Rosen . |
| 5,497,421 | 3/1996 | Kaufman et al. . |
| 5,509,071 | 4/1996 | Petrie, Jr. et al. . |
| 5,553,145 | 9/1996 | Micali . |
| 5,610,982 | 3/1997 | Micali . |
| 5,666,420 | 9/1997 | Micali . |

OTHER PUBLICATIONS

N. Asokan, et al., "Optimistic Fair Exchange of Digital Signatures", IBM Research Division, Zurich Research Laboratory pp 1–20.
Jianying Zhou and Dieter Gollmann, "A Fair Non–repudiation Protocol", Dept. of Computer Science, University of London, pp 55–61.
Zhou, Jianying et al., "A Fair Non–repudiation Protocol", 1996, IEEE, pp. 55–61.
Janson, Phil et al., "Electronic Payment Systems", SEMPER Document 2117B018, May 1, 1996.
Abad–Peiro, J.L., "Designing a Generic Payment Service", ACTS Project AC026, SEMPER, Nov. 26, 1996.
Waidner, Michael, "Development of a Secure Electronic Marketplace for Europe", *Proceedings of ESORICS 96*, Rome, Sep. 1996.

SEMPER—Project AC026—ACTS Programme, Document 431 ZR031, SEMPER Consortium, Mar./Jul. 1995.
Asokan, N. et al., "Optimistic Protocols for Multi–Party Fair Exchange", Research Report RZ 2892, Computer Science/Mathematics, IBM Research Division, Nov. 29, 1996.
Asokan, N. et al., "Optimistic Protocols for Fair Exchange", Research Report RZ 2858, Computer Science/Mathematics, IBM Research Division, Sep. 2, 1996.
Asokan, N. et al., "Optimistic Fair Exchange of Digital Signatures", IBM Zürich Research Laboratory, Switzerland, Nov. 17, 1997, pp. 1–29.
Abad–Peiro et al., "Designing a Generic Payment Service" (Nov. 26, 1996).
Asokan et al., "Optimistic Protocols for Multi–Party Fair Exchange," IBM Research Report RZ 2892 (Dec. 9, 1996).
Asokan et al., "Optimistic Fair Exchange of Digital Signatures," IBM Research Report.
Asokan et al., "The State of the Art in Electronic Payment Systems," IEEE Computer, Sep. 1997, pp. 28–35.
Asokan et al., "Optimistic Fair Exchange of Digital Signatures" Advances in Cryptology (K. Nyberg, ed.), Proc. Eurocrypt 198 , pp. 591–606 (1997).
Asokan et al., "Optimistic Protocols for Fair Exchange," IBM Research Report RZ 2858 (Sep. 2, 1996).
Asokan et al., "Server–Supported Signatures," Proceedings of ESORICS '96 (Sep. 25–27, 1996).
Asokan et al., "Server–Supported Signatures," Journal of Computer Security pp 1–13 (1997).
Asokan et al., "Asynchronous Protocols for Optimistic Fair Exchange," IBM Research Report, Proc. IEEE Symposium on Research in Security and Privacy, pp. 86–99 (1998).
Batelaan et al., "Internet Billing Service Design and Prototype Implementation," Carnegie Mellon University Information Networking Institute 1992 Final Project (Mar. 30, 1993).
Bellare et al., "iKP—A Family of Secure Electronic Payment Protocols" (Jul. 12, 1995).

(List continued on next page.)

*Primary Examiner*—Salvatore Cangialosi
*Attorney, Agent, or Firm*—Hutchins, Wheeler & Dittmar

[57] ABSTRACT

An electronic communication in the presence of a trusted party enables an exchange of unpredictable values in which a second party receives a first value produced by a first party and unpredictable to the second party if and only if the first party receives a second value produced by the second party and unpredictable to the first party. The communication includes exchanging a first set of communications between the first and second parties without participation of the trusted party to attempt completion of the exchange of unpredictable values. If the exchange of unpredictable values is not completed using the first set of communications between the first and second parties, the trusted party takes action to complete the exchange. At least one party is authenticated to belong to a group of parties that exchanges unpredictable values. The group may be a group of subscribers. The at least one party may be authenticated by a digital signature. The digital signature may be produced by the trusted party. The digital signature may also authenticate a key of the at least one party.

51 Claims, No Drawings

OTHER PUBLICATIONS

Ben–Or et al., "A Fair Protocol for Signing Contracts," IEEE Transactions on Information Theory, v. 36 n. 1, pp. 40–46 (Jan. 1990).

Ben–Or et al., "A Fair Protocol for Signing Contracts," Automata, Languages and Programming, pp. 43–52 (Jul. 1985).

Blum, M., "How to Exchange (Secret) Keys," ACM Transactions on Computer Systems, v. 1 n. 2, pp. 175–193 (May 1983).

Burk et al., "Digital Payment Systems Enabling Security and Unobservability," Computers & Security, v. 8, pp. 399–416 (1989).

Burk et al., "Value Exchange Systems Enabling Security and Unobservability," Computers & Security, v. 9, pp. 715–720 (1990).

Camenisch et al., "Digital Payment Systems with Passive Anonymity–Revoking Trustees" Journal of Computer Security (1996).

Camensich et al., "An Efficient Fair Payment System," Proc. 3rd ACM Conf. on Computer Security, pp 88–94 (1996).

Casey et al., "Secure Automated Document Delivery," Fifth Annual Computer Security Applications Conference, pp. 348–356 (Dec. 4–8, 1989).

Chaum D., "Untraceable Electronic Mail, Return Addresses, and Digital Pseudonyms," Communications of the ACM, v. 24 n. 2, pp. 84–88 (Feb. 1981).

Chaum, D., Security Without Identification: Transaction Systems to Make Big Brother Obsolete, Comm of ACM, vol. 28 No. 10, pp. 1030–1044 (Oct. 1985).

Chaum, et al., Untraceable Electronic Cash, Proc. Crypto '88, pp. 329–327 (1988).

Cheng, et al., *Design and Implementation of Modular Key Management Protocol and IP Secure Tunnel on AIX*, IBM Thomas J. Watson Research Center (Apr. 28, 1995).

Chor, et al., Verifiable Secret Sharing and Achieving Simultaneity in the Present of Faults, POC, 26th FOCS, pp. 383–395.

Damgard, I., Payment Systems and Credential Mechanisms With Provable Security Against Abuse by Individuals, Proc Crypto '88, pp. 328–335 (1988).

DeMillo, et al., Protocols for Data Security, IEEE Computer, pp. 39–50 (Feb. 1983).

Desmedt, et al., *Threshold Cryptosystems*, University of Wisconsin–Milwaukee, pp. 307–315.

Dolev, et al., Non–Malleable Cryptography, Comm. of ACM, pp. 542–552 (Mar. 1991).

Dukach, S., *SNPP: A Simple Network Payment Protocol*, M.I.T. Laboratory for Computer Science.

Even, et al., A Randomized Protocol for Signing Contracts, Comm. of the ACM, vol. 28, No. 6, pp. 637–647 (Jun. 1995).

Even, S., Secure Off–Line Electronic Fund Transfer Between Nontrusting Parties, Computer Science Department Technion, Israel Institute of Technology, pp. 1–10 (Jan. 31, 1988).

Even, et al., *On–Line/Off–Line Digital Signatures*, International Association for Cryptographic Research, 1996, pp. 0–28.

Frankel, et al., *Indirect Discourse Proofs: Achieving Efficient Fair Off–Line E–Cash*.

Franklin, et al., Fair Exchange with a Semi–Trusted Third Party, Proc. of the 4th ACM Conf. on Computer and Comm. Security, Apr. 1997, pp. 1–6.

Goldreich, et al., How to Play Any Mental Game, Proc. 27th Ann. IEEE ACM Sympoisum on Theory of Computing, pp. 218–229 (1987).

Goldreich, et al., Proofs that Yield Nothing But Their Validity or All Languages in NP Have Zero–Knowledge Proof Systems, Association for Computing Machinery, vol. 38, No. 1, pp. 691–729 (Jul. 1991).

Goldwasser, et al., The Knowledge Complexity of Interactive Proof Systems, SIAM J. Comput. vol. 18, No. 1, pp. 186–208 (Feb. 1989).

Herda, S., Constituting evidence and proof in digital cooperation, Computer Standards and Interfaces 17 (1995), pp. 69–79.

Hickman, et al., *The SSL Protocol,* Netscape Communications Corp. (Jun. 1995).

Jakobsson, M., Reducing Costs in Identification protocols, Crypto '92 (1992).

Janson, et al., *Electronic Payment Over Open Networks,* IBM Zurich Research Laboratory CH 8803 Ruschlikon, Switzerland (Apr. 18, 1995).

Janson, et al., *Electronic Payment Systems,* pp. 1–24 (May 1, 1996).

Kilian, J., et al., *Identity Escrow,* pp. 1–18.

Koleta, G.B., Cryptographers Gather to Discuss Research, Science, pp. 646–647 (Nov. 11, 1981).

Konheim et al., Digital Signatures and Authentications, Cryptography, A Primer, (1981), pp. 334–367.

Low, et al., Anonymous Credit Cards, 2nd ACM Conference on Computer and Communication Security, pp. 1–10 (1994).

Luby, et al., How to Simultaneously Exchange a Secret Bit by Flipping a Symmetrically–Biased Coin, IEEE, pp. 11–21 (1983).

Myer, P., *Cryptography: A guide for the design and implementation of cryptographic Systems,* McGraw–Hill, Inc., pp. 386–430 (1982).

Mueller–Schloer, et al., The Implementation of a Cryptography–Based Secure Office System, AFIPS Conference Proc. 1982, pp. 487–492 (1982).

Needham, et al., Using Encryption for Authentication in Large Networks of Computers, Comm. of ACM, vol. 21, No. 12, pp. 993–999 (Dec. 1978).

Pedersen, T., Electronic Payments of Small Amounts, Aarhus Univ. Tech. Rpt. DAIMI PB–495, pp. 1–12 (Aug. 1995).

Otway, et al., Efficient and Timely Mutual Authentication, ACM Operating Systems Review, vol. 21, No. 1, pp. 8–10 (Jan. 1987).

Neuman, et al., Requirements for Network Payment: The NetCheque™ Perspective, Proc. IEEE Compcon '95, San Francisco (Mar. 1995).

Rabin, M., *How To Exchange Secrets,* (May 20, 1981) pp. 1–21.

Rabin, M., *Transaction Protection by Beacons,* TR–29–81, Harvard University Center for Research in Computing Technology, (Nov. 1981) pp. 1–21.

Rescorla et al., *The Secure HyperText Transfer Protocol,* Enterprise Integration Technologies, (Jul. 1995) pp. 1–40.

Rihaczek, K., Teletrust, Computer Networks and ISDN Systems 13 (1987) pp. 235–239.

Rivest et al., A Method for Obtaining Digital Signatures and Public–Key Cryptosystems, Programming Techniques (Feb. 1978) pp. 120–126.

Graham, et al., A Method for Obtaining Digital Signatures and Public–Key Cryptosystems, Programming Techniques, pp. 120–126.

SEMPER Project AC026 ACTS Programme (Mar./Jul. 1995).

Serenelli et al., *Securing Electronic Mail Systems, MILCOM 92 (San Diego, CA 1992)* pp. 29.1.1–29.1.4.

Shamir, A., How to Share a Secret, Comm. ACM v. 22, n. 11 (Nov. 1979) pp. 612–613.

Simmons, J., An Impersonation–Proof Identity Verification Scheme, Advances in Cryptology—Crypto '87, pp. 211–215.

Simmons, J., Zero–Knowledge Proofs of Identity and Veracity of Transaction Receipts, Advances in Cryptology—Eurocrypt 188, pp. 35–49.

Simmons, A Protocol to Provide Verifiable Proof of Identity and Unforgeable Transaction Receipts, IEEE Journal on Selected Areas in Communications, vol. 7, No. 4, May 1989, pp. 435–447.

Sirbu, et al., *NetBill: An Internet Commerce System Optimized for Network Delivered Services,* Engineering and Public Policy Department, Computer Science Department, Carnegie Mellon. University, Pittsburgh, Pennsylvania 15213, pp. 1–11.

Snare, J.L., Secure Electronic Data Interchange, Computer Security in the Age of Information, (W.L. Caelli, ed.), IFIP, 1989, pp. 331–342, (1989).

Sollins, K.R., Cascaded Authentication, IEEE Symposium on Security and Privacy (Apr. 18–21, 1988), pp 156–163.

Stadler et al, Fair Blind Signatures, Advances in Cryptology—Eurocrypt '95 (1995).

Stein et al., *The Green Commerce Model,* pp. 1–17, (Oct. 1994).

Tsudik, G., *Zurich iKP Prototype (ZiP), Protocol Specification Document,* IBM Zurich Research, pp. i–27 (Mar. 5, 1996).

Varadharajan et al., Formal Specification of A Secure Distributed Messaging System, 12th National Computer Security Conference Proceedings, pp. 146–171, (Oct. 1991).

Varadharajan, V., Notification: A Practical Security Problem in Distributed Systems, 14th National Computer Security Conference, pp. 386–396, (Oct. 1991).

Waidner, M., Development of a Secure Electronic Marketplace for Europe, Proc. of ESORICS 96, Rome, (Seq. 1996), pp. 1–15.

Zhou et al., A Fair Non–Repudiation Protocol, IEEE (1996), pp. 55–61.

SIMULTANEOUS ELECTRONIC TRANSACTIONS WITH SUBSCRIBER VERIFICATION

CROSS REFERENCE TO RELATED APPLICATIONS

This application is based on U.S. provisional patent application No. 60/027,614 filed on Oct. 1, 1996 and is a continuation-in-part of U.S. patent application Ser. No. 08/832,071 filed on Apr. 2, 1997, pending, which is a continuation of U.S. patent application Ser. No. 08/751,217 filed on Nov. 18, 1996, now U.S. Pat. No. 5,666,420, which is a continuation of U.S. patent application Ser. No. 08/408,551, filed on Mar. 21, 1995, abandoned.

TECHNICAL FIELD

The present invention relates generally to electronic commerce and transactions and more particularly to techniques for enabling users to effect certified mail, contract signing and other electronic notarization functions.

BACKGROUND OF THE INVENTION

The value of many transactions depends crucially on their simultaneity. Indeed, simultaneity may be so important to certain financial transactions that entities often are willing to incur great inconvenience and expense to achieve it. For example, consider the situation where two parties have negotiated an important contract that they now intend to "close." Often, the parties find it necessary to sign the document simultaneously, and thus they meet in the same place to watch each other's actions. Another example is the process of certified mail, where ideally the sender of a message desires that the recipient get the message simultaneously with the sender's obtaining a "receipt". A common certified mail procedure requires a person who delivers the mail to personally reach the recipient and obtain a signed acknowledgement when the message is delivered. This acknowledgement is then shipped to the sender. Again, this practice is costly and time consuming. Moreover, such acknowledgements do not indicate the content of the message.

In recent years, the cost, efficiency and convenience of many transactions have been improved tremendously by the availability of electronic networks, such as computer, telephone, fax, broadcasting and others. Yet more recently, digital signatures and public-key encryption have added much needed security to these electronic networks, making such communication channels particularly suitable for financial transactions. Nevertheless, while electronic communications provide speed, they do not address simultaneity.

The absence of simultaneity from electronic transactions severally limits electronic commerce. In particular, heretofore there has been no effective way of building so-called simultaneous electronic transactions ("SET's"). As used herein, a SET is an electronic transaction that is simultaneous at least in a "logically equivalent" way, namely it is guaranteed that certain actions will take place if and only if certain other actions take place. One desirable SET would be certified mail, however, the prior art has not addressed this problem effectively. This can be seen by the following consideration of a hypothetical example, called extended certified mail or "ECM".

In an ECM transaction, there is a sender, Alice, who wishes to deliver a given message to an intended recipient, Bob. This delivery should satisfy three main properties. First, if Bob refuses to receive the message (preferably before learning it), then Alice should not get any receipt. Second, if Bob wishes to receive the message, then he will receive it and Alice will get a receipt for the message. Third, Alice's receipt should not be "generic," but closely related to the message itself. Simultaneity is important in this transaction. For instance, Alice's message could be an electronic payment to Bob, and it is desired that she obtains a simultaneous receipt if possible.

Alice could try to get a receipt from Bob of a message m in the following way. Clearly, sending m to Bob in the clear as her first communication does not work. Should this message be her digital signature of an electronic payment, a malicious Bob may lose any interest in continuing the conversation so as to deprive Alice of her receipt. On the other hand, asking Bob to send first a "blind" receipt may not be acceptable to him.

Another alternative is that Alice first sends Bob an encryption of m. Second, Bob sends Alice his digital signature of this ciphertext as an "intermediate" receipt. Third, Alice sends him the decryption key. Fourth, Bob sends Alice a receipt for this key. Unfortunately, even this transaction is not secure, because Bob, after learning the message when receiving Alice's key, may refuse to send her any receipt. (On the other hand, one cannot consider Bob's signature of the encrypted message as a valid receipt, because Alice may never send him the decryption key.)

These problems do not disappear by simply adding a few more rounds of communication, typically consisting of "acknowledgements". Usually, such additional rounds make it more difficult to see where the lack of simultaneity lies, but they do not solve the problems.

Various cryptographic approaches exist in the literature that attempt to solve similar problems, but they are not satisfactory in many respects. Some of these methods applicable to multi-party scenarios propose use of verifiable secret sharing (see, for example, Chor et al), or multi-party protocols (as envisioned by Goldreich et al) for making simultaneous some specific transactions between parties. Unfortunately, these methods require a plurality of parties, the majority of which are honest. Thus, they do not envision simultaneous transactions involving only two parties. Indeed, if the majority of two parties are honest then both parties are honest, and thus simultaneity would not be a problem. Moreover, even in a multi-party situation, the complexity of these prior art methods and their amount and type of communication (typically, they use several rounds of broadcasting), make them generally impractical.

Sophisticated cryptographic transactions between just two parties have been developed but these also are not simultaneous. Indeed, if just two people send each other strings back and forth, and each one of them expects to compute his own result from this conversation, the first to obtain the desired result may stop all communications, thereby depriving the other of his or her result. Nonetheless, attempts at providing simultaneity for two-party transactions have been made, but by using assumptions or methods that are unsatisfactory in various ways.

For example, Blum describes transactions that include contract signing and extended certified mail and that relies on the two parties having roughly equal computing power or knowledge of algorithms. These assumptions, however, do not always hold and are hard to check or enforce anyway. In addition, others have discovered ways to attack this rather complex method. A similar approach to simultaneity has also been proposed by Even Goldreich and Lempel. In another Blum method for achieving simultaneous certified mail, Alice does not know whether she got a valid receipt. She must go to court to determine this, and this is undesirable as well.

A method of Luby et al allows two parties to exchange the decryption of two given ciphertexts in a special way, namely, for both parties the probability that one has to guess correctly the cleartext of the other is slowly increased towards 100%. This method, however, does not enable the parties to achieve guaranteed simultaneity if one party learns the cleartext of the other's ciphertext with absolute probability (e.g., by obtaining the decryption key); then he can deny the other a similar success.

For this reason several researchers have tried to make simultaneous two-party transactions via the help of one or more external entities, often referred to as "centers", "servers" or "trustees", a notion that appears in a variety of cryptographic contexts (see, for instance, Needham and Schroder and Shamir). A method for simultaneous contract signing and other transactions involving one trustee (called a "judge") has been proposed by Ben-Or et al. Their method relies on an external entity only if one party acts dishonestly, but it does not provide guaranteed simultaneity. In that technique, an honest party is not guaranteed to have a signed contract, even with the help of the external entity. Ben-Or et al only guarantee that the probability that one party gets a signed contract while the other does not is small. The smaller this probability, the more the parties must exchange messages back and forth. In still another method, Rabin envisions transactions with the help of external party that is active at all times (even when no transaction is going on), but also this method does not provide guaranteed simultaneity.

The prior art also suggests abstractly that if one could construct a true simultaneous transaction (e.g., extended certified mail), then the solution thereto might also be useful for constructing other types of electronic transactions (e.g., contract signing). As noted above, however, the art lacks an adequate teaching of how to construct an adequate simultaneous transaction.

There has thus been a long-felt need in the art to overcome these and other problems associated with electronic transactions. It would be useful to provide true simultaneous electronic transactions and to provide an electronic transaction having guaranteed simultaneity in a two-party scenario and with minimal reliance and support of a third party.

It would also be useful to provide simultaneous electronic transactions between two parties that rely on third parties in a minimal and convenient manner. In particular, it would be useful to provide electronic transactions between two parties that guarantee simultaneity via the help of an invisible third party. A third party is said to be "invisible" because it does not need not to take any action if the transaction occurs with the parties following certain prescribed instructions. Only if one of the original parties deviates from these instructions may the other invoke the intervention of the up-to-then invisible third party, who then can still guarantee the simultaneity of the transaction even though it has not participated from its inception.

BRIEF SUMMARY OF THE INVENTION

According to the present invention, a communication method between a first and second party, in the presence of a trusted party, enables a transaction in which the second party receives a first value produced by the first party and unpredictable to the second party if and only if the first party receives a second value produced by the second party and unpredictable to the first party. The method includes two basic steps: exchanging a first set of communications between the first and second parties without participation of the trusted party to attempt completion of the transaction, and if the transaction is not completed using the first set of communications between the first and second parties, having the trusted party take action to complete the transaction.

Where the first party's value is a message and the second party's value is a receipt, the transaction is a certified transmission of the first party's message. Alternatively, the first party's value represents a commitment to a contract and the second party's value represents a commitment to the contract, such that the transaction is a contract closing.

Preferably, according to the method the first party can prove that some information it receives is the second value, and the second party can prove that some information it receives is the first value.

According to the more specific aspects of the method, at least one of the first and second parties and the trusted party can encrypt messages, and at least one of the first and second parties and the trusted party can decrypt messages. The first set of communications includes at least one communication of the first party to the second party of a data string generated by a process including encrypting a second data string with an encryption key of the trusted party. The second data string includes a ciphertext generated with an encryption key of one of the parties, as well as information specifying or identifying at least one of the parties. The first set of communications also includes at least one communication of the second party of a data string generated by a process that includes having the second party digitally sign a data string computed from information received from the first party in a prior communication, wherein the data string generated by the second party is the second party's value.

According to further aspects of the method, if the second party does not get the first value in the first set of communications, the second party sends the trusted party, for further processing, a data string that includes at least part of the data received from the first party. The further processing by the trusted party includes decrypting a ciphertext with a secret decryption key. The trusted party then sends the first party information that enables the first party to compute the second value, and the trusted party sends the second party information that enables the second party to compute the first value. In either case, the trusted party also verifies identity information of at least one of the parties but preferably does not learn the first value.

According further to the present invention, an electronic communication in the presence of a trusted party enables an exchange of unpredictable values in which the second party receives a first value produced by the first party and unpredictable to the second party if and only if the first party receives a second value produced by the second party and unpredictable to the first party, by exchanging a first set of communications between the first and second parties without participation of the trusted party to attempt completion of the exchange of unpredictable values and, if the exchange of unpredictable values is not completed using the first set of communications between the first and second parties, having the trusted party take action to complete the exchange, where at least one party is authenticated to belong to a group of parties that exchanges unpredictable values. The group may be a group of subscribers. The at least one party may be authenticated by a digital signature. The digital signature may be produced by the trusted party. The digital signature may also authenticate a key of the at least one party. The key may be an encryption key and/or a digital signature key. The at least one party may verify that an other one of the parties belongs to the group. The at least one party may provide an other one of the parties with data authenticating that the at least one party belongs to the group. The trusted party may take action only if the first party belongs to the group and/or only if the second party belongs to the group.

The trusted party may take a first type of action if the first party belongs to the group and a second type of action otherwise. The first type of action may include payment of a first fee and the second type of action may include payment of a second fee. Similarly, the trusted party may take a first type of action if the second party belongs to the group and a second type of action otherwise. The first type of action may include payment of a first fee and the second type of action may include payment of a second fee. The trusted party may take action if and only if both first and second parties belong to the group.

According further to the present invention, an electronic communication between a first and second party in the presence of a trusted party enables an exchange of unpredictable values in which the second party receives a message produced by the first party if and only if the first party receives a receipt produced by the second party, by exchanging a first set of communications between the first and second parties without participation of the trusted party to attempt completion of the exchange of the message and the receipt and, if the exchange is not completed using the first set of communications between the first and second parties, having the trusted party take action complete the exchange, where at least one party is authenticated to belong to a group of parties that exchange messages and receipts.

According further to the present invention, first and second parties and a trusted party effect a certified mail transaction, each of the parties having secret keys, and the first party desires to send a message to the second party and obtain a message receipt to thereby complete the certified mail transaction, by having the first party generate and send the second party a data string including an encryption, decryptable with a secret key known to the trusted party, of information that prevents the second party from obtaining the first party's message without the first party obtaining the message receipt, upon receipt by the second party of the data string, having the second party generate and send to the first party the message receipt, upon receipt by the first party of the message receipt, having the first party send to the second party information that enables the second party to retrieve the message, having the second party attempt to verify whether the message was received, and, if the message was not received, having the second party send information to the trusted party for further processing, where the information includes the data string and where at least one party is authenticated to belong to a group of parties that effect certified mail transactions.

DETAILED DESCRIPTION OF THE DRAWINGS

For a more complete understanding of the present invention and the advantages thereof, reference should be made to the following Detailed Description in conjunction with the accompanying drawings in which:

FIG. 1 illustrates a preferred embodiment of the present invention in which a transaction between a sender and a recipient is completed without involvement of a trusted party;

FIG. 2 shows the case where the recipient proceeds directly to the trusted party for resolution without providing a receipt for the message to the sender;

FIG. 3 shows the case where the sender does not provide the recipient with a form of the message readable to the recipient after receiving the message receipt; and FIG. 4 shows the case where the sender does not provide the recipient with a readable form of the same message included in its original transmission.

DETAILED DESCRIPTION

In each of the schemes described below, there is a user Alice and a user Bob. The "invisible" third party may be a financial center that facilitates SETs among its customers, including Alice and Bob. For convenience, the following description shows how to make extended certified mail "simultaneous", although the invention is not so limited. In the context of an ECM system, the third party is called the Post Office (abbreviated "P.O.", in FIGS. 1–4). As will be seen, however, contrary to ordinary certified mail, the Post Office here is invisible. The inventive scheme is also preferable to ordinary certified mail because the message receipt also guarantees the content of the message. Also, the electronic transaction is faster, more informative and more convenient than traditional certified mail, and its cost should be substantially lower.

In the preferred embodiment, an extended certified mail system is provided using a single "invisible" trustee or "trusted" party. The system is implemented in a computer network, although it should be realized that telephone, fax, broadcast or other communication networks may be used. Thus, without limitation, it is assumed that each user in the system has a computer capable of sending and receiving messages to and from other computers via proper communication channels.

Each user in the system has a unique identifier. Alice's identifier is denoted by A, and Bob's identifier is B. The identifier of the Post Office is denoted by PO. Users and the Post Office can digitally sign messages. Thus, each has a secret signing key and a matching public verification key. If m is a message (string), then $SIG_A(m)$ indicates Alice's signature of m. (It is assumed, for convenience, that m is always retrievable from its signature. This is the case for most signature schemes, and it is otherwise possible to consider a signed message as the pair consisting of the message and its signature.)

Users and the Post Office can encrypt messages by means of a public-key encryption algorithm (e.g., RSA). Thus, each has a public encryption key and a corresponding secret decryption key. $E_A(m)$, $E_B(m)$, and $E_{PO}(m)$ denote, respectively, the encryption of a message m with the public key of Alice, Bob, and the Post Office. For simplicity, it is assumed that these schemes are secure in the sense that each of $E_A$, $E_B$, and $E_{PO}$ appear to behave as a random function. The system can be suitably modified if these functions are much less secure.

Again, for simplicity these encryption algorithms are deterministic and uniquely decodable. Thus, given a value y and a message m, all can verify whether y is the encryption of m with, for example, the Post Office's key, by checking whether $E_{PO}(m)$ equals y. (If the encryption scheme is probabilistic, then one may convince another that a string y is an encryption of a message by providing m together with the random bits that were used to encrypt m.) If y is a ciphertext generated by means of the encryption algorithm E, $E^{-1}(y)$ denotes the corresponding cleartext, whether or not E defines a permutation. (It may also be possible to use encryption algorithms that are not uniquely decodable, for instance, if it is hard to decrypt a given ciphertext in two different ways.) For simplicity, messages are encrypted directly with a public-key algorithm, however, one could first encrypt a message conventionally with some key k, and then encrypt k with a public-key algorithm. (Thus, to decrypt m, one need only just decrypt k).

In one preferred embodiment outlined below and shown in FIGS. 1–4, the ECM method requires 5 possible steps of communication: A1 and A2 for user Alice, B1 and B2 for user Bob, and PO for the Post Office. However, at most 3 steps should have to be executed. As shown in FIG. 1, if Alice and Bob are both honest, only steps A1, B1, and A2 will be executed, and in this order. As shown in FIGS. 2 and 4, Step B2 will be executed only if Alice fails to execute Step A2 properly. As shown in FIG. 3, the execution of Step B2 causes the Post Office to execute its only step, PO. The protocol is as follows:

A1. Given her message m, Alice computes $z=E_{PO}((A, B, E_B(m)))$, the encryption in the Post Office public key of a triplet consisting of identifiers A, B and the message encrypted in Bob's key, and then sends z to Bob.

B1. Upon receiving z from Alice, Bob digitally signs it and sends it to Alice as the receipt.

A2. If Alice receives the properly signed receipt from Bob (these three transactions A1, B1 and A2 are shown in FIG. 1), she sends m to Bob.

B2. If, within a given interval of time after having executed Step B1, Bob receives a string m such that $E_{PO}((A, B, E_B(m)))=z$, the value originally received from Alice, then he outputs m as the message and halts. Otherwise, Bob sends the value z signed by him to the Post Office indicating that Alice is the sender and he is the recipient (FIG. 3 shows this step when Alice sends no string at all, and FIG. 4 shows this step when Alice sends a string m' which does not meet the condition $E_{PO}((A, B, E_B(m')))=z)$.

PO. If Bob's signature relative to z is correct, the Post Office decrypts z with its secret key. If the result is a triplet consisting of A, B and a string x, the Post Office (a) sends Alice the value z signed by Bob as the receipt, and (b) sends x to Bob.

Preferably, Alice sends z to Bob digitally signed by her. In addition, Alice may sign z in a standard format that indicates z is part of an extended certified mail sent from Alice to Bob, e.g., she may sign the tuple (ECM, A, B, z). In this way, Bob is certain that z comes from Alice and that, when Alice holds a receipt for m signed by Bob, he will have a certified version of m. Further, if z is digitally signed by Alice, Bob first checks Alice's signature, and then countersigns z himself. The adoption of a standard format also insures that, by signing z as part of an ECM system, Bob does not sign accidently a message that has been prepared by Alice maliciously. Also, the Post Office may also check Alice's signature or any additional formats if these are used.

In analyzing the protocol, it should be noted that Alice, given Bob's signature of z as receipt, can prove the content of the message by releasing m. Indeed, all can compute $x=E_B(m)$ and then verify that $E_{PO}((A, B, x))=z$.

Notice also that the Post Office does not understand the message sent via the ECM protocol, whether or not it is called into action. Rather, the Post Office can only obtain $E_B(m)$, but never m in the clear (in this embodiment).

Third, notice that m is, by definition, equal to $E^{-1}_B(x)$, where $(A, B, x)=E_{PO}^{-1}(z)$, and may be nonsensical. Indeed, nothing prevents Alice from sending Bob a garbled message. However, she can only get a receipt for this same garbled message. It is also noted that, if not every string is an encryption of some message, Alice may choose z so that it is not the encryption of anything. In such case, however, she cannot ever claim to have a receipt for any message. Alternatively, it may be desirable to use cryptosystems for which either every string is an encryption of some other string or such that it can be easily detected whether y encrypts something.

The protocol works for the following reasons. When receiving the value $z=E_{PO}((A, B, E_B(m)))$ from Alice, Bob will have difficulty in computing $E_B(m)$, and thus m, from z without the Post Office's secret key. Thus, if he halts, Alice would not get her receipt, but Bob would not get m either.

Assume now that Bob signs z and sends it to Alice. Because this gives Alice a valid receipt from Bob for her message m, for the simultaneity constraint to hold, it must be shown that Bob easily obtains m. This is certainly true if Alice sends m to Bob in Step A1. Assume therefore that Alice does not send him m. Then, as shown in FIG. 2, Bob presents z signed by him to the Post Office, essentially asking the Post Office to retrieve (for him) $E_B(m)$ from z. The Post Office complies with this request. In doing so, however, the Post Office also sends Alice z signed by Bob as the receipt. It does so to prevent one last possibility; that Bob, upon receiving z from Alice in Step A1, rather than sending her the receipt in Step B1, goes directly to the Post Office in order to have $E_B(m)$ extracted from z.

Summarizing, if Alice sends a message encrypted with the Post Office key to Bob, and Bob does not send Alice a receipt, or if he does not access the Post Office, Bob will never learn m. Otherwise, Alice is guaranteed to get her receipt for m either from Bob or from the Post Office. On the other hand, upon receiving an encrypted message, Bob is guaranteed that he will understand it, either helped by Alice or helped by the Post Office.

In the preferred embodiment above, the triplet (which includes the ciphertext $E_B(m)$) also includes A and B. The ciphertext is customized in this way so that it can be used by the system only for the purpose of Alice sending a message to Bob. Whether or not this customization is performed, the system is very convenient to use because everyone knows the public key of the Post Office, because everyone can encrypt a value with that key, and because the Post Office can remove this encryption layer for those recipients who claim to have been betrayed by their senders. However, without the above (or an equivalent) customization, this same convenience could be exploited by a malicious recipient, who could learn his messages while denying the senders their legitimate receipts.

In particular, assume that this customization is removed altogether. Then, a malicious Bob, upon receiving $z'=E_{PO}(E_B(m))$—rather than $z=E_{PO}((A, B, E_B(m)))$—from Alice in Step A1, may behave as follows. First, he does not send Alice any receipt. Second, he signs z'. Third, he gives this signed value to the Post Office complaining that a sender Chris (an accomplice of his) is refusing to send him the message in the clear. At this point, the Post Office, after verifying Bob's signature and not having any way of checking whether Chris is the real sender, retrieves $E_B(m)$ from z' and sends $E_B(m)$ to Bob, while simultaneously sending the signed z' to Chris as his receipt. Of course, Chris may destroy or hide this receipt. Meanwhile Alice, who does not get any receipt after Step A1, may think that Bob is away or does not want to receive her message. But she believes that Bob will never be able to read her message in any case.

This violation of the simultaneity constraint (i.e., Bob receiving m while Alice having no receipt) may still occur if, without any customization, Alice signs z when sending it to Bob in Step A1. Indeed, Bob would have no trouble in removing Alice's signature, asking Chris to sign z' and then presenting to the Post Office z' signed by Chris and countersigned by himself. The Post Office, after verifying Bob's and Chris's signatures, would still (after removing its encryption layer) send $E_B(m)$ to Bob and the receipt to Chris. This violation of simultaneity, however, does not occur with the customization of the triplet to include A and B. Indeed, assume that Bob gives the Post Office the value $z=E_{PO}(A, B, E_B(m))$ originally received by Alice and signed by him and Chris, claiming that it was sent to him by Chris. Then, the Post Office, after verifying Bob's (and Chris's) signature and after computing the value $E_{PO}^{-1}(z)$, will notice that this value—i.e. (A, B, $E_B(m)$)—does not specify Chris to be the sender and Bob the receiver.

The benefits of this customization may be implemented in varying ways. For instance, Alice's signature of (B, $E_B(m)$) may be sufficient to indicate that the sender is Alice and the receiver is Bob. More generally, any customization that prevents Bob from obtaining $E_B(m)$ from the Post Office while convincing the Post Office not to send Alice the receipt is within the scope of the invention.

It should be realized that any customization for the purpose of simultaneous electronic transactions is itself within the scope of the present invention, whether or not implemented with an invisible third party. For instance, Alice may send $E_{PO}(A, B, E_B(m))$ directly to the Post Office, which gives $E_B(m)$ to Bob (if Bob signs the receipt for Alice) after checking that Alice and Bob are, respectively, the sender and the receiver. Alternatively, Alice may send the Post Office $E_{PO}(SIG_A(B, E_B(m)))$ for identifying the sender and the recipient in a way that cannot be decoupled from the transaction. Such approaches may be especially useful with a plurality of trustees as described below. Such an approach, which calls into action the trusted party directly with a proper customization step as described, is also useful for hiding the identity of the sender from the recipient. Indeed, the Post Office may solicit a proper receipt from Bob without disclosing Alice's identity (even if the receipt indicates the content of Alice's message).

Although not specified above explicitly, it should be appreciated that all or part of the actions required by the Post Office, Alice or Bob, can be realized in software. Some of these actions can also be performed by hardware, or physically secure devices (i.e. devices such as secure chips having at least some portion of which is tamper-proof).

Many variations of the disclosed protocol can be envisioned and are within the scope of the present invention. For instance, while the "receipt" described above witnesses the content of the message sent, the receipt can be made generic, e.g., by having Bob sign a "declaration" (instead of a string including an encrypted version of the message) that he has received an encrypted message from Alice at a given time. Also, if desired, the customization step (i.e. the inclusion of the identifiers A and B in the triplet) can be omitted. This might be advantageous, for example, when no other user may collude with either Alice or Bob to disrupt simultaneity. This may occur where there is no third user, as in the case when certified mail occurs between two predetermined people. In the disclosed system, the Post Office cannot learn the content of the message, but such a restriction can be removed also (e.g., by having Alice compute $z=E_{PO}(A, B, m)$). It may also be convenient to one-way hash strings prior to signing them.

Still another variation would be to impose some temporal element on the transaction. For instance, when Alice sends Bob $z=E_{PO}(A, B, E_B(m))$, she may sign z together with some additional information that specifies a certain time (either absolute or relative to the sending time) after which the Post Office will not help Bob obtain the message. Preferably, Alice specifies this time in a signed manner both outside the Post Office encryption layer as well as within the triplet. In such case, the Post Office must obtain from Bob all necessary information to verify that the time specified outside the PO encryption layer checks with the time specified within the triplet. If it does not, then several possibilities may occur. For example, the Post Office will not help Bob recover the message, or the message is considered unsent (even if Alice obtains a receipt).

Other variations are also possible. Some variations may be used in conjunction or in alternative to the techniques described above. One group of such variants concerns the encryption method used.

For instance, $E_B$ does not need to be interpreted as an encryption algorithm for which Bob has the decryption key. It may just be an encryption algorithm for which Bob can have the message decrypted. For example, and without limitation, the decryption key of $E_B$ may lie with a group of people, each having a piece of the key. These same alternative interpretations apply also to $E_A$ or $E_{PO}$.

Also, while public-key cryptosystems are quite convenient, it should be realized that conventional cryptosystems could be used for the ECM protocol. For example, x may be the conventional encryption of (A, B, $E_B(m)$) with a secret key k shared between Alice and the Post Office. This key k may be released if it is desired that Bob verify m to be the genuine message. If, however, it is feared that release of a different key may change the content of the messages, special redundancies could be used. For instance, conventionally a message M is encrypted by actually encrypting (M, H(M)), where H is a one-way function. Thus, if e is an encryption of (M, H(M)) with a key k, it is hard to find a second key K such that e also is an encryption with that key of (M'H(M')). It is preferable that k, rather than being a secret key shared by Alice and the Post Office, is a temporary key that Alice may transfer to the Post Office separately by means of a different shared key K. This way, divulging k (e.g., for the purpose of convincing Bob of the value of $E_B(m)$) does not force the Post Office and Alice to agree on another conventional key k.

It should also be appreciated that the digital signatures of the ECM system need not be public key signatures. For instance, there may be private key digital signatures or signatures verifiable with the help of other parties, or other suitable forms of message authentication. Thus, as used herein, "digital signatures" and "digital signing" should be broadly construed. Similarly, the notion of encryption with a key of some party should be broadly construed to include encrypting with a public key of that party or encrypting with a secret key shared with that party or known to that party.

There may also be concern that the Post Office will collude with one of the parties. For instance, the Post Office may collude with Bob who, rather than sending the receipt to Alice, goes directly to Post Office, and this enables Bob to understand his message but without giving Alice any receipt. This may occur in ordinary certified mail. Indeed, one who delivers the post may leave a letter with his intended recipient without asking him or her to sign a receipt. Nonetheless, this potential problem may be dealt with effectively and efficiently. For instance, the Post Office may be (or make use of) a physically secure device. Assuming that the Post Office uses such a device in the preferred embodiment, then it will be hard for user Bob to have the Post Office decrypt (A, B, $E_B(m)$) for him without sending Alice her receipt. Indeed, the chip can be programmed to perform both operations or none. Although use of physically secure devices might increase the cost of a system, this need not be the case. Indeed, while they may be millions of users, there may be one or much fewer Post Offices. (Each user, of course, may benefit also from being or relying upon physically secure devices.)

While the inventive ECM system is very economical as it requires at most three communication steps, the goals can be accomplished also by more steps. In particular, although the trusted party, upon receiving Bob's communication, can enable Bob to get his message and Alice to get her receipt, without sending messages back and forth, this goal can be accomplished by means of a more complex dialogue. Indeed, more elaborate dialogues, and in particular zero knowledge proofs (see, e.g., Goldwasser et al or Goldreich et al) could be useful (also as an alternative to physically secure devices) to give Bob the message or Alice the receipt so that they learn their respective values, but are not able to "prove" these values to third parties.

A further alternative method envisions a Post Office with a plurality of trustees. A multiplicity of trustees can be beneficial for various aspects, particularly, if the system is set up so that more than one of the trustees must collude for cheating to occur. Presumably, however, each trustee is selected with trustworthiness (or, if it is a device, proper functioning) as a criterion, and thus the possibility that more than one of them is malicious or defective is very small.

A simultaneous ECM system with a multiplicity of trustees may make novel use of prior techniques such as fair cryptography, or secret sharing, verifiable secret sharing or threshold cryptosystems.

In a construction based on fair public cryptosystems, the triplets $(A, B, E_B(m))$ are not encrypted with the Post Office's public key, but rather with a user public key. In this embodiment, user Alice computes a pair of public and secret key of a fair public-key cryptosystem, properly shares her secret key with the trustees of the Post Office (e.g., receiving from said trustees a certification that they got legitimate shares of this user key) in some initial phase, and then performs Step A1 of the above ECM protocol. If needed, Bob may turn to the Post Office and instructs the trustees to reconstruct Alice's user key. By doing so, the trustees cannot monitor or cause the Post Office to monitor the message addressed by Alice to Bob, but can reconstruct the triplet $(A, B, E(m))$. To insure that the Post Office trustees do not collude with Bob in depriving Alice of her receipt, it can be arranged that each trustee, when contributing its own piece of a user secret key, also gives a proper acknowledgement to that user. Thus, unless all n trustees do not behave properly, Alice would receive at least one receipt.

A possible drawback of this fair-cryptography based system is that Alice must interact with the trustees in order to give them shares of her user key. Thus, the trustees are not fully invisible. This interaction may not even be confined to a single initial phase. This is because Alice may not be able to reuse her key after Bob accesses the Post Office and causes its reconstruction. To alleviate this problem, it might be desirable to use physically secure devices and having the trustees reveal their own pieces to such a device, which would then be able to announce $(A, B, E_B(m))$ without proof.

A better approach uses the ECM protocol, but involves splitting the secret key of the Post Office rather than the secret user keys. Thus, Alice would continue to encrypt $(A, B, E_B(m))$ with the help of the Post Office public key, whose corresponding secret key is shared among the n trustees but is not known to any single entity (nor has it been prepared by any single entity). Thus, the n trustees must cooperate, under Bob's proper request, in removing the Post Office's encryption layer. However, they do so without reconstructing the Post Office secret key, not even internally to the Post Office. To this end, a threshold cryptosystem may be used). This solution is now illustrated using the well-known Diffie-Hellman public-key cryptosystem.

In the Diffie-Hellman system, there is a prime p and a generator g common to all users. A user X chooses his own secret key x at random between 1 and p−1, and sets his public key to be $g^x$ mod p. Let y and $g^y$ mod p, respectively, be the secret and public keys of user Y. Then X and Y essentially share the secret pair key $g^{xy}$ mod p. Indeed, each of X and Y can compute this pair-key by raising the other's public key to his own secret key mod p. On the other hand, without knowledge of x or y, no other user, given the public keys $g^x$ mod p and $g^y$ mod p and based on any known method, can compute the pair-key $g^{xy}$. Thus X and y can use this key to secure communications between each other (e.g., by using it as the key of a symmetric cipher).

Let now $T_1, \ldots T_n$ be the trustees of the Post Office. Then, each $T_i$ chooses a secret key xi and a matching public key $g^{xi}$ mod p. Then the public key of the Post Office is set to be the product of these public keys mod p, $g^z$ mod p (i.e., $g^z = g^{x1+ \cdots +xn}$ mod p). Thus, each trustee has a share of the corresponding secret key, z. Indeed, the Post Office's secret key would be z=x1+ . . . +xn mod p−1. Assume now that Alice wishes to encrypt $(A, B, E_B(m))$ with the Post Office's key. She selects a (preferably) temporary secret key a and its corresponding public key $g^a$ mod p. She then computes the public pair-key $g^{az}$ mod p, encrypts $(A, B, E_B(m))$ conventionally with the secret pair-key $g^{az}$, and then sends Bob this ciphertext together with the temporary public-key $g^a$ mod p (all in Step A1). If in Step B1 Bob sends Alice back a receipt, namely, his signature of the received message, then Alice, in Step A2, sends him the secret key a. This enables Bob to compute the pair-key $g^{az}$ mod p (from a and the Post Office's public key), and thus decrypt the conventional ciphertext to obtain $(A, B, E_B(m))$. Thus, if both users behave properly, the Post Office is not involved in the transaction. Assume now that Bob properly asks the Post Office to decrypt Alice's ciphertext. To do this, the trustees cooperate (preferably, with proper notice to Alice and to each other) in computing $g^{az}$ mod p. To this end, each trustee $T_i$ raises Alice's public key $g^a$ mod p to its own secret key. That is, $T_i$ computes $g^{axi}$ mod p. Then these shares of the pair-key are multiplied together mod p to obtain the desired private pair-key. In fact, $g^{ax1} \ldots g^{axn}$ mod $p=g^{ax1+ \cdots +axn}$ mod $p=g^{a(x1+ \cdots xn)}$ mod $p=g^{az}$ mod p. This key may be given to Bob, who can thus obtain $E_B(m)$. In this method, it may be useful to have a Post Office representative handle the communications with Bob, while the individual trustees handle directly their sending Alice receipts.

This method can be adjusted so that sufficiently few (alternatively, certain groups of) trustees cannot remove the Post Office's encryption layer, while sufficiently many (alternatively, certain other groups of) trustees can. For instance, there can be kn trustees, and each of the n trustees acting as above can give his own secret key to each of a group of k−1 other trustees. Thus, each distinct group of k trustees has knowledge of a secret key as above. Further, the above-described modifications to the single invisible-trustee ECM protocol can be applied to embodiments involving multiple trustees.

In the ECM system involving fair cryptography, even a user might be or rely upon a multiplicity of entities. Indeed, in the invention, "user" or "party" or "trusted party" thus should be construed broadly to include this possibility.

It should be appreciated that the inventive ECM systems enable Alice and Bob to exchange simultaneously two special values, the first, produced by Alice, which is (at least reasonably) unpredictable to Bob, and the second, produced by Bob, which is unpredictable to Alice. Indeed, the value produced by Bob and unpredictable to Alice may be Bob's signature of step B1. If the message is not known precisely by Bob, then the message itself may be the value produced by Alice and unpredictable to Bob. Alternatively, if Bob knows the message precisely (but it is desired that he receive it from Alice in an official and certified manner), then the parties may use a customization step so that, for example $SIG_A(m, E_B(m))$ is the value produced by Alice and unpredictable to Bob.

The inventive system is useful to facilitate other electronic transactions that require the simultaneous exchange of unpredictable values. One such example, not meant to be limiting, involves a contract "closing" wherein a pair of users desire to sign a contract at a particular time and place. The invention thus allows Alice and Bob to sign a contract simultaneously with an invisible third party. Indeed, the first value may be Alice's signature of the contract C and the second value Bob's receipt for a message consisting of Alice's signature of C.

In particular, assume that Alice and Bob have already negotiated a contract C. Then, Alice and Bob agree (in a preliminary agreement) (a) that Alice is committed to C if Bob gets the message consisting of Alice's signature to C, and (b) that Bob is committed to C if Alice gets Bob's receipt of that message. This preliminary agreement can be "sealed" in many ways, for instance by signing, preferably standardized, statements to this effect conventionally or digitally. It does not matter who signs this preliminary agreement first because Bob does not have Alice's message and Alice does not have Bob's receipt. However, after both parties are committed to the preliminary agreement, the inventive ECM system allows the message and the receipt to be exchanged simultaneously, and thus C is signed simultaneously. Those skilled in the art also may realize it may be more convenient to first one-way hash C prior to signing it.

This method may be much more practical than accessing a commonly trusted lawyer particularly, when the contract in question may be very elementary or arises in an "automatic context". Generalizing, one may view a contract C as any arbitrary signal or string of symbols to which the parties wish to commit in a simultaneous way. The inventive solution is very attractive because it can be implemented in software in many contexts, and because the trustee is invisible and need not be called into use if the signatories behave properly. This minimizes cost and time, among other resources. In this application, the trustee, rather than a post office, may be a "financial service center" that facilitates the transactions of its own customers.

Yet another application of the invention is to make simultaneous the result of applying a given function to one or more secret values, some belonging to Alice and some belonging to Bob. For example, the inventive method allows implementation of "blind" negotiations. In this embodiment, assume a seller Alice and a buyer Bob desire to determine whether Alice's (secret) minimum selling price is lower than Bob's (secret) maximum selling price (in a way that both parties will learn the result simultaneously). If the answer is no, then the parties may either try again or terminate the negotiation. Alternatively, if the answer is yes, then preferably the parties also will be committed to the transaction at some value. (For example, the average of the two secret values).

Another useful application of the invention is during a bid process, such as in an auction. For instance, assume that multiple bidders wish that their secret bids be revealed simultaneously. One bidder may also wish that his or her bid be independent of the other bids.

Other possibilities are described below:

Consider a Certified E-Mail (CEM) system with invisible trustees. (Similar considerations hold for other Simultaneous Electronic Transaction (SET) systems as well.) In such a system, a Sender S sends certified e-mail to a Recipient R so that R gets the message if and only if S gets the corresponding receipt, preferably indicating the exact content of the message. S and R need not rely on a trustee (for concreteness only called an electronic post office, PO) for each such a transaction. Indeed, the PO need not be involved in the transaction, nor save anything long term about it, and nor even be aware that S and R are engaging in a CEM protocol before hand. Nonetheless, if one of the parties tries to cheat, the other detects cheating and can approach the EPO to obtain "justice," extremely quickly and with probability 1. (For instance, if S, having obtained her receipt, tries to deprive R from learning the message, R can obtain the message from the PO.)

Such a CEM system is very attractive from many points of view. First, it is very efficient, because it involves (most of the time at least) only two players: sender and recipient. Second, it does not create bottlenecks as when all messages have to pass by the PO. It can work (at least when no cheating occurs) if just Sender and Recipient are electronically connected to each other. Even more importantly, perhaps, it is very economical. In fact, the PO has minimal expenses and minimal liabilities. Indeed, because a cheater is guaranteed to be detected and not to gain any advantage, presumably there will be almost no cheating, and thus the PO will almost never be called into play. Moreover, even if called into play, the PO is required to perform very simple operations. Also, the PO has almost no liability, and thus need not carry any form of liability insurance, nor incur different types of expenses. For instance, if the PO had to store the message or a crucial portion of an ECM transaction, the possibility occurs that it may lose it, in which case the Sender may be deprived of her receipt, or the Recipient of the message. These damaged customers may thus legitimately sue the PO. All such liability costs are likely to be charged to the users, causing expensive CEM systems. In a CEM with invisible trustees, instead, the PO only needs to handle whatever information is given (e.g., by the Recipient) for fraction of seconds, and needs not store anything about the transaction before or after. Thus, even if its computer or storage system were to crash completely, the negative effects will be minimal. In such a system, therefore, the PO essentially acts as an insurance company, with the difference that, while once in a while such a company is called to pay large sums, the PO is, rarely, just called to perform some simple operations.

It is not immediately clear, however, that a commercial entity has any financial incentive to provide such PO services. Indeed, the PO's services are going to be needed most rarely, or even never, and being paid on a per-service basis may not be attractive at all. We thus want to explore ways of making financially attractive for the PO to offer its services (while keeping its costs and users' costs low), as well as to further disincentivate cheating.

One way the PO can make money is charging a subscription fee. In other words, it may require from users a small yearly fee (say, $10). If a user pays such a fee, then it can count on the PO's help when needed. For instance, a subscribing recipient will be helped by the PO to obtain the message if a malicious Sender who has obtained the receipt from the Recipient tries to deny him the message. (In addition to the basic subscription fee, the PO may then charge a modest amount each time it intervenes, just to cover its small amount of work and its small and very time-bounded liability.) However, the PO may refuse to help a cheated recipient if he is not a subscriber. Alternatively, it may charge a very high fee for such a help (e.g., $1,000).

Subscription fees, or other similar mechanisms, can thus be a very effective way for making it rewarding for a given entity to play the role of the electronic PO in such a CEM system. At the same time, the cost to the user may still be very low; because such fees can be minimal given that the PO has very little to do and very little risk.

Subscription-based ECM systems with invisible trustees may be enhanced by enabling Senders to know which users are subscribers of the PO. There are various ways of realizing such enhancements. For instance the PO may post or divulge which are its own subscribers. Alternatively, a subscriber may inform the other party of a CEM transaction that he is a subscriber. Upon request, the PO may back up such claims (for a fee if so wanted). The PO may also furnish its subscribers with a subscription proof; for instance, a digital signature indicating that the user in question is a subscriber, possibly also indicating the subscription period. Given that, in the preferred embodiment, senders also encrypt messages with the recipient key (preferably a public key), an effective way to provide such a proof may consist of a digital signature of the PO of the key of the (subscribing) recipient, preferably together with the recipient's name and with additional information (e.g., time information, validity period information, etc.). Such a signature of the PO may in itself signify that the user of the signed key is a subscriber in good standing. Alternatively, the PO may sign the key together with a separate indication that it is a subscriber's key. The PO may sign a subscriber's key together with its user name, or other identifier (such as an e-mail address of the user). In this case the PO is in effect certifying the user key at least for the purposes of CEM transactions. Alternatively, the PO may just sign the key of the subscribing user, and the fact that such a key belongs to a specific user may be proved by a certificate issued by some other authority, binding the key to its owner. Alternatively, the PO may countersign a certificate (possibly issued by a different authority), to indicate that now the key in question is a subscriber's key, while "inheriting" the key-owner binding from the first certificate. Alternatively, the PO may verify a certificate binding a user key with its owner (which certificate it preferably stores), and, if the owner also becomes a subscribe if its, it may issue its own digital signature binding the key and its subscribing owner. (This approach vouches not only for the fact that the key belongs to a user for which subscription fees have been paid, but also for the identity of the key's owner, as long as one who inspects such a "certificate" of the PO trusts it to perform a correct verification of the original certificate. The approach is easy for the PO, because it does not oblige it to identify the owner in question, say, in person. (Indeed, it may be enough that it receives a subscription fee for a given user together with a valid certificate for that user's key signed by another authority. If so wanted, the PO may also provide an indication of the original certificate or of the original authority.)

What is claimed is:

1. An electronic communication method between a first and second party, in the presence of a trusted party, enabling an exchange of unpredictable values in which the second party receives a first value produced by the first party and unpredictable to the second party if and only if the first party receives a second value produced by the second party and unpredictable to the first party, comprising:

(a) exchanging a first set of communications between the first and second parties without participation of the trusted party to attempt completion of the exchange of unpredictable values; and (b) if the exchange of unpredictable values is not completed using the first set of communications between the first and second parties, having the trusted party take action to complete the exchange, wherein at least one party is authenticated to belong to a group of parties that exchange unpredictable values.

2. A method according to claim 1, wherein the group is a group of subscribers.

3. A method according to claim 1, wherein the at least one party is authenticated by a digital signature.

4. A method according to claim 3, wherein the digital signature is produced by the trusted party.

5. A method according to claim 3, wherein the digital signature also authenticates a key of the at least one party.

6. A method according to claim 5, wherein the key is an encryption key.

7. A method according to claim 5, wherein the key is a digital signature key.

8. A method according to claim 1, wherein the at least one party verifies that an other one of the parties belongs to the group.

9. A method according to claim 1, wherein the at least one party provides an other one of the parties with data authenticating that the at least one party belongs to the group.

10. A method according to claim 1, wherein the trusted party takes action only if the first party belongs to the group.

11. A method according to claim 1, wherein the trusted party takes action only if the second party belongs to the group.

12. A method according to claim 1, wherein the trusted party takes a first type of action if the first party belongs to the group and a second type of action otherwise.

13. A method according to claim 12, wherein the first type of action includes payment of a first fee and the second type of action includes payment of a second fee.

14. A method according to claim 1, wherein the trusted party takes action only if the second party belongs to the group.

15. A method according to claim 1, wherein the trusted party takes a first type of action if the second party belongs to the group and a second type of action otherwise.

16. A method according to claim 15, wherein the first type of action includes payment of a first fee and the second type of action includes payment of a second fee.

17. A method according to claim 1, wherein the trusted party takes action if and only if both first and second parties belong to the group.

18. An electronic communication method between a first and second party, in the presence of a trusted party, enabling an exchange in which the second party receives a message produced by the first party if and only if the first party receives a receipt produced by the second party, comprising:

(a) exchanging a first set of communications between the first and second parties without participation of the trusted party to attempt completion of the exchange of the message and the receipt; and (b) if the exchange is not completed using the first set of communications between the first and second parties, having the trusted party take action to complete the exchange, wherein at least one party is authenticated to belong to a group of parties that exchange messages and receipts.

19. A method according to claim 18, wherein the group is a group of subscribers.

20. A method according to claim 18, wherein the at least one party is authenticated by a digital signature.

21. A method according to claim 20, wherein the digital signature is produced by the trusted party.

22. A method according to claim 20, wherein the digital signature also authenticates a key of the at least one party.

23. A method according to claim 22, wherein the key is an encryption key.

24. A method according to claim 22, wherein the key is a digital signature key.

25. A method according to claim 18, wherein the at least one party verifies that an other one of the parties belongs to the group.

26. A method according to claim 18, wherein the at least one party provides an other one of the parties with data authenticating that the at least one party belongs to the group.

27. A method according to claim 18, wherein the trusted party takes action only if the first party belongs to the group.

28. A method according to claim 18, wherein the trusted party takes action only if the second party belongs to the group.

29. A method according to claim 18, wherein the trusted party takes a first type of action if the first party belongs to the group and a second type of action otherwise.

30. A method according to claim 29, wherein the first type of action includes payment of a first fee and the second type of action includes payment of a second fee.

31. A method according to claim 18, wherein the trusted party takes action only if the second party belongs to the group.

32. A method according to claim 18, wherein the trusted party takes a first type of action if the second party belongs to the group and a second type of action otherwise.

33. A method according to claim 32, wherein the first type of action includes payment of a first fee and the second type of action includes payment of a second fee.

34. A method according to claim 18, wherein the trusted party takes action if and only if both first and second parties belong to the group.

35. A method by which first and second parties and a trusted party effect a certified mail transaction, each of the parties having secret keys, and wherein the first party desires to send a message to the second party and obtain a message receipt to thereby complete the certified mail transaction comprising:

(a) having the first party generate and send the second party a data string including an encryption, decryptable with a secret key known to the trusted party, of information that prevents the second party from obtaining the first party's message without the first party obtaining the message receipt;

(b) upon receipt by the second party of the data string, having the second party generate and send to the first party the message receipt;

(c) upon receipt by the first party of the message receipt, having the first party send to the second party information that enables the second party to retrieve the message;

(d) having the second party attempt to verify whether the message was received; and (e) if the message was not received, having the second party send information to the trusted party for further processing, wherein the information includes the data string and wherein at least one party is authenticated to belong to a group of parties that effect certified mail transactions.

36. A method according to claim 35, wherein the group is a group of subscribers.

37. A method according to claim 35, wherein the at least one party is authenticated by a digital signature.

38. A method according to claim 37, wherein the digital signature is produced by the trusted party.

39. A method according to claim 37, wherein the digital signature also authenticates a key of the at least one party.

40. A method according to claim 39, wherein the key is an encryption key.

41. A method according to claim 39, wherein the key is a digital signature key.

42. A method according to claim 35, wherein the at least one party verifies that an other one of the parties belongs to the group.

43. A method according to claim 35, wherein the at least one party provides an other one of the parties with data authenticating that the at least one party belongs to the group.

44. A method according to claim 35, wherein the trusted party takes action only if the first party belongs to the group.

45. A method according to claim 35, wherein the trusted party takes action only if the second party belongs to the group.

46. A method according to claim 35, wherein the trusted party takes a first type of action if the first party belongs to the group and a second type of action otherwise.

47. A method according to claim 46, wherein the first type of action includes payment of a first fee and the second type of action includes payment of a second fee.

48. A method according to claim 35, wherein the trusted party takes action only if the second party belongs to the group.

49. A method according to claim 35, wherein the trusted party takes a first type of action if the second party belongs to the group and a second type of action otherwise.

50. A method according to claim 49, wherein the first type of action includes payment of a first fee and the second type of action includes payment of a second fee.

51. A method according to claim 35, wherein the trusted party takes action if and only if both first and second parties belong to the group.

* * * * *